United States Patent Office 3,299,136
Patented Jan. 17, 1967

3,299,136
METHOD FOR PRODUCING CYCLO-
HEXYLAMINE BIBORATES
Michael Peter Brown, East Molesey, Surrey, and Anthony E. Dann, Chiswick, London, England, assignors to United States Borax & Chemical Corporation, Los Angeles, Calif.
No Drawing. Filed Oct. 9, 1963, Ser. No. 314,844
Claims priority, application Great Britain, Oct. 25, 1962, 40,479/62
10 Claims. (Cl. 260—563)

This invention relates to the preparation of compounds of boron and nitrogen, and in particular to a method for producing cyclohexylamine biborates.

It has been proposed to make cyclohexylamine biborate by the reaction of cyclohexylamine with boric acid, according to the equation:

$$C_6H_{11}NH_2 + 2H_3BO_3 \rightarrow C_6H_{11}NH_2 \cdot B_2O_3 \cdot H_2O + 2H_2O$$

This process has proved unsuitable for large scale use because of several disadvantages. For example, it is necessary to use a large excess of cyclohexylamine and also an organic diluent, such as toluene, to aid in the separation of the product by filtration; however, the water produced in the reaction is found with the excess amine and the diluent in the filtrate from the separation. Although it is highly desirable to recycle the filtrate so as to make use of the unchanged reactants which it contains, the continual build-up of water makes this impracticable.

It is an object of the present invention to provide a method for producing biborates of cyclohexylamines which is free from these disadvantages. Other objects will be apparent from the following disclosure.

According to the present invention, biborates of cyclohexylamines are produced by reacting at an elevated temperature a cyclohexylamine with a mixture of boric oxide and boric acid, the boron compounds preferably being in substantially equimolecular proportions, or with metaboric acid ($HBO_2$), or with all three.

The term "cyclohexylamine" is, wherever the context permits, to be understood as denoting not only the primary amine $C_6H_{11}NH_2$, but also secondary and tertiary amines having one cyclohexyl group attached to the amino nitrogen atom, the other group or groups being preferably lower alkyl groups such as methyl, ethyl, propyl or butyl groups.

In the case of the reaction of cyclohexylamine with a mixture of boric oxide and boric acid, it can be illustrated by the equation:

$$1.5 C_6H_{11}NH_2 + H_3BO_3 + B_2O_3 \rightarrow 1.5 C_6H_{11}NH_2 \cdot B_2O_3 \cdot H_2O$$

When metaboric acid is used, the reaction can be illustrated by the equation:

$$C_6H_{11}NH_2 + 2HBO_2 \rightarrow C_6H_{11}NH_2 \cdot B_2O_3 \cdot H_2O$$

Preferably the cyclohexylamine reactant is present in an excess, such as in amount 1.1 to 6 times the amount theoretically required. Thus, when a mixture of boric oxide and boric acid is used, as the reactant, we prefer at least 1.5 moles of cyclohexylamine to 2 moles of the boric mixture. When metaboric acid is used, we prefer at least 0.5 mole of the amine for each mole of the acid.

It is preferred to carry out the process in a liquid reaction medium, advantageously in about the minimum amount needed to allow effective and easy mixing of the reactants by a stirrer or equivalent agitation means. Suitable reaction media are the aliphatic or aromatic hydrocarbons such as a light petroleum, or a chlorine substitution product thereof. The liquid medium should be sufficiently volatile to be easily removed by evaporation from the cyclohexylamine biborate formed.

The reaction temperature employed is not critical as long as it is somewhat higher than room temperature. When a liquid reaction medium is used, close control of the temperature is obtained by working at the refluxing temperature of the reaction medium. Generally speaking, we use a reaction temperature in the range of from about 25° C. to about 150° C., and preferably from about 60° C. to about 100° C.

When the reaction is substantially complete, the volatile components of the mixture, primarily unreacted amine and liquid reaction medium, can be removed by warming the product under vacuum, and collected as by condensation in a cold trap. Since they are substantially free from water they can be recycled to the process with the addition of the stoichiometric proportions of amine, boric oxide and boric acid, and/or metaboric acid for production of additional biborate.

Cyclohexylamine biborate is useful as a corrosion inhibitor for ferrous metals. It can be used in the form of a solution with which the metal to be protected is in contact, or it can also be used with advantage in wrappings in which articles of ferrous metals are packed, or it can be sprinkled in powder form on the articles. Very useful anti-corrosion wrappings can be made by impregnating paper or other wrapping material with a solution of cyclohexylamine biborate, and evaporating off the solvent, leaving the amine borate in the material. Use of the compounds as corrosion inhibtors for ferrous metals is disclosed and claimed in copending application Serial No. 365,485, filed May 6, 1964 by Raymond Thompson, Michael Peter Brown, Howard Bernard Silver and Anthony Edward Dann.

The following examples are presented to illustrate the invention but it is not intended that the invention be limited to the specific examples given.

Example I

Cyclohexylamine, boric oxide and boric acid in molecular proportions 3:1:1 were mixed with light petroleum (B.P. 60°–80° C.) and heated with stirring under slow reflux for 2 hours. The reaction vessel was cooled and connected to a vacuum line, after which the temperature was again raised to about 70° C., the volatile materials distilling over being condensed in a cold trap. The solid residue of cyclohexylamine biborate analyzed as follows:

|  | $C_6H_{11}NH_2$ | $B_2O_3$ | $H_2O$ |
|---|---|---|---|
| Percent | 51.36 | 37.72 | 10.92 |
| Ratio | 1.0 | 1.04 | 1.17 |

Yield (on $B_2O_3$) 96.5%.

The unchanged cyclohexylamine and the light petroleum oil were recovered quantitatively, and after the addition of further amine, boric oxide and boric acid in the molecular proportions 1:0.66:0.66, could be used in the production of a further batch of cyclohexylamine biborate.

Example II

Cyclohexylamine (198.3 g.; 2.0 mole) and metaboric acid (87.44 g.; 2.0 mole) were mixed with light petroleum (150 ml.; B.P. 80°–100° C.) and the stirred reaction mixture was heated at 70° C. for 0.5 hour, after this time the mixture suddenly reacted and went solid. On the addition of a further 150 ml. light petroleum, the mixture again became stirrable and was heated under gentle reflux with stirring for a further 2.5 hours. The volatiles were removed under vacuum and the product was finally dried at 80° C. in an oven to give 176 grams (94.2%) of product having the following analysis:

|  | Percent | Ratio |
|---|---|---|
| Cyclohexylamine | 51.17 | 1 |
| $B_2O_3$ | 37.83 | 1.05 |
| $H_2O$ | 11.0 | 1.18 |

*Example III*

Cyclohexylamine (275 g.; 2.78 mole) and metaboric acid (221 g.; 5.04 mole) were mixed in a flask equipped with a stirrer and reflux condenser. The slurry first formed was stirred continuously and heated in an oil bath. At a bath temperature of 75° C., the slurry quickly thickened and could no longer be stirred. At this point, a very vigorous reaction occurred and cyclohexylamine refluxed violently in the condenser. The reaction mixture was then heated at 80°–90° C. for a further 2 hours. The product was then removed from the flask and oven dried at 90° C. to give 455 grams (97.2% yield).

Analysis:

|  | Percent | Ratio |
|---|---|---|
| Cyclohexylamine | 52.81 | 1 |
| $B_2O_3$ | 38.89 | 1.06 |
| $H_2O$ | 8.30 | 0.88 |

Other modes of applying the principle of the invention may be employed, change being made as regards the details described, provided the features stated in any of the following claims or the equivalent of such be employed.

We therefore, particularly point out and distinctly claim as our invention:

1. The method for producing a cyclohexylamine biborate which comprises reacting at an elevated temperature of from about 25° C. to about 150° C., a member of the group consisting of cyclohexylamine and secondary and tertiary cyclohexylamines in which the amino-nitrogen is substituted with lower alkyl groups, with a member of the group consisting of metaboric acid and a substantially equimolar mixture of boric oxide and boric acid.

2. The method according to claim 1 in which said elevated temperature is in the range of from about 60° C. to about 100° C.

3. The method for producing cyclohexylamine biborate which comprises reacting at an elevated temperature of from about 25° C. to about 150° C. cyclohexylamine with metaboric acid, at least 0.5 mole of said cyclohexylamine being present for each mole of metaboric acid.

4. The method according to claim 3 in which said elevated temperature is in the range of from about 60° C. to about 100° C.

5. The method for producing cyclohexylamine biborate which comprises reacting at an elevated temperature of from about 25° C. to about 150° C. cyclohexylamine with a substantially equimolar mixture of boric oxide and boric acid, said reactants being present in a molar ratio of at least 1.5 moles of cyclohexylamine to two moles of boric oxide and boric acid mixture.

6. The method according to claim 5 in which said elevated temperature is in the range of from about 60° C. to about 100° C.

7. The cyclic process for producing cyclohexylamine biborate according to the equation $$C_6H_{11}NH_2 + 2HBO_2 \rightarrow C_6H_{11}NH_2 \cdot B_2O_3 \cdot H_2O$$

which comprises combining cyclohexylamine with metaboric acid in a liquid hydrocarbon reaction medium, said cyclohexylamine being present in an amount 1.1 to 6 times the theoretical amount, and heating the reaction mass to a temperature of from about 25° C. to about 150° C. to form said cyclohexylamine biborate, separating the excess cyclohexylamine and liquid hydrocarbon to give substantially pure, solid cyclohexylamine biborate, and recycling the recovered cyclohexylamine and liquid hydrocarbon for reaction with additional metaboric acid to produce additional cyclohexylamine biborate according to said equation.

8. The process according to claim 7 in which the reaction mass is heated to a temperature of from about 60° C. to about 100° C.

9. The process according to claim 7 in which the reaction mass is heated to a temperature of from about 60° C. to about 100° C.

10. The cyclic process for producing cyclohexylamine biborate according to the equation $$1.5C_6H_{11}NH_2 + H_3BO_3 + B_2O_3 \rightarrow 1.5C_6H_{11}NH_2 \cdot B_2O_3 \cdot H_2O$$

which comprises combining cyclohexylamine with equimolar amounts of boric acid and boric oxide in a liquid hydrocarbon reaction medium, said cyclohexylamine being present in an amount 1.1 to 6 times the theoretical amount, and heating the reaction mass to a temperature of from about 25° C. to about 150° C. to form said cyclohexylamine biborate, separating the excess cyclohexylamine and liquid hydrocarbon to give substantially pure, solid cyclohexylamine biborate, and recycling the recovered cyclohexylamine and liquid hydrocarbon for reaction with additional boric acid and boric oxide to produce additional cyclohexylamine biborate according to said equation.

References Cited by the Examiner
UNITED STATES PATENTS 2,710,401  7/1955  Rowe _____ 260—563 X CHARLES B. PARKER, *Primary Examiner.*

R. V. HINES, *Assistant Examiner.*

UNITED STATES PATENT OFFICE
CERTIFICATE OF CORRECTION

Patent No. 3,299,136 January 17, 1967

Michael Peter Brown et al.

It is hereby certified that error appears in the above numbered patent requiring correction and that the said Letters Patent should read as corrected below.

Column 4, line 29, for the claim reference numeral "7" read -- 10 --; same column 4, line 30, strike out "from".

Signed and sealed this 24th day of October 1967.

(SEAL)
Attest:

Edward M. Fletcher, Jr.
Attesting Officer

EDWARD J. BRENNER
Commissioner of Patents